(12) United States Patent
Gonzalez et al.

(10) Patent No.: US 10,240,631 B2
(45) Date of Patent: Mar. 26, 2019

(54) BEARING APPARATUS INCLUDING A BEARING ASSEMBLY HAVING A CONTINUOUS BEARING ELEMENT AND A TILTING PAD BEARING ASSEMBLY

(71) Applicants: US SYNTHETIC CORPORATION, Orem, UT (US); WAUKESHA BEARINGS CORPORATION, Pewaukee, WI (US)

(72) Inventors: Jair J. Gonzalez, Provo, UT (US); Leonidas C. Leite, Provo, UT (US); Sriram Venkatesan, Waukesha, WI (US)

(73) Assignees: US SYNTHETIC CORPORATION, Orem, UT (US); WAUKESHA BEARINGS CORPORATION, Pewaukee, WI (US)

( * ) Notice: Subject to any disclaimer, the term of this patent is extended or adjusted under 35 U.S.C. 154(b) by 0 days.

(21) Appl. No.: 15/528,709

(22) PCT Filed: Nov. 24, 2015

(86) PCT No.: PCT/US2015/062434
§ 371 (c)(1),
(2) Date: May 22, 2017

(87) PCT Pub. No.: WO2016/089680
PCT Pub. Date: Jun. 9, 2016

(65) Prior Publication Data
US 2017/0261031 A1 Sep. 14, 2017

Related U.S. Application Data

(60) Provisional application No. 62/087,132, filed on Dec. 3, 2014.

(51) Int. Cl.
*F16C 17/03* (2006.01)
*F16C 17/06* (2006.01)
*F16C 33/04* (2006.01)

(52) U.S. Cl.
CPC .......... *F16C 17/065* (2013.01); *F16C 17/035* (2013.01); *F16C 33/043* (2013.01);
(Continued)

(58) Field of Classification Search
CPC ..... F16C 17/065; F16C 17/035; F16C 33/043
See application file for complete search history.

(56) References Cited

U.S. PATENT DOCUMENTS 4,296,976 A 10/1981 Heshmat et al.
5,393,145 A 2/1995 Ide
(Continued)

FOREIGN PATENT DOCUMENTS

JP H07317752 A 12/1995

OTHER PUBLICATIONS

International Search Report and Written Opinion from International Application No. PCT/US2015/062434 dated Mar. 1, 2016.
(Continued)

*Primary Examiner* — Thomas R Hannon
(74) *Attorney, Agent, or Firm* — Dorsey & Whitney LLP

(57) ABSTRACT

Embodiments disclosed herein relate to bearing apparatuses including a bearing assembly having a continuous superhard bearing element including a continuous superhard bearing surface and a tilting pad bearing assembly. The disclosed bearing apparatuses may be employed in pumps, turbines or other mechanical systems. In an embodiment, the bearing apparatus includes a first and second bearing assembly. The first bearing assembly includes a first support ring and a plurality of tilting pads. Each tilting pad is tilted and/or tiltably secured relative to the first support ring. The second
(Continued)

bearing assembly includes a continuous superhard bearing element. The continuous superhard bearing element includes a continuous superhard bearing surface facing the plurality of tilting pads and exhibits a maximum lateral width greater than about 2 inches.

26 Claims, 9 Drawing Sheets

(52) U.S. Cl.
CPC ...... *F16C 2206/04* (2013.01); *F16C 2206/56* (2013.01); *F16C 2206/58* (2013.01); *F16C 2206/60* (2013.01); *F16C 2206/82* (2013.01); *F16C 2352/00* (2013.01)

(56) References Cited

U.S. PATENT DOCUMENTS

| | | | |
|---|---|---|---|
| 5,989,511 A * | 11/1999 | Gruen | C23C 14/0605 |
| | | | 117/108 |
| 8,025,157 B2 * | 9/2011 | Takita | B01D 61/06 |
| | | | 210/416.2 |
| 8,276,691 B2 * | 10/2012 | Qian | B24D 3/10 |
| | | | 175/425 |
| 8,545,103 B1 | 10/2013 | Cooley et al. | |
| 8,789,281 B1 | 7/2014 | Knuteson et al. | |
| 9,284,980 B1 * | 3/2016 | Miess | F16O 33/043 |
| 9,346,149 B1 * | 5/2016 | Linford | B24D 3/10 |
| 2003/0019106 A1 * | 1/2003 | Pope | A61L 27/04 |
| | | | 29/898 |
| 2009/0268995 A1 | 10/2009 | Ide | |
| 2013/0192899 A1 | 8/2013 | Cooley et al. | |
| 2014/0102810 A1 | 4/2014 | Peterson et al. | |
| 2014/0248008 A1 | 9/2014 | Brahm et al. | |

OTHER PUBLICATIONS

U.S. Appl. No. 13/734,354, filed Jan. 4, 2013.
U.S. Appl. No. 61/948,970, fled Mar. 6, 2014.
U.S. Appl. No. 62/002,001 filed May 22, 2014.
U.S. Appl. No. 62/087,132 filed Dec. 3, 2014.
Lee, et al., "Chemical Vapor Deposition of Silicon Carbide Using a Novel Organometallic Precursor", Materials Research Society, vol. 131, Office of Naval Research,Contract N00014-85-K-0632, Task No. 625-826, Technical Report No. 5., May 15, 1989, 9 pages.

* cited by examiner

BEARING APPARATUS INCLUDING A BEARING ASSEMBLY HAVING A CONTINUOUS BEARING ELEMENT AND A TILTING PAD BEARING ASSEMBLY

CROSS-REFERENCE TO RELATED APPLICATIONS

This application claims priority to U.S. Provisional Application No. 62/087,132 filed on 3 Dec. 2014, the disclosure of which is incorporated herein, in its entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard polycrystalline diamond layer that is commonly referred to as a diamond table. The diamond table is formed and bonded to a substrate using a high-pressure/high-temperature ("HPHT") process.

A thrust-bearing apparatus includes a number of superhard bearing elements affixed to a support ring. The superhard bearing elements (e.g., a PDC bearing element) bear against other superhard bearing elements of an adjacent bearing assembly during use. Superhard bearing elements are typically brazed directly into a preformed recess formed in a support ring of a fixed-position thrust bearing.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments disclosed herein relate to bearing assemblies and apparatuses, which may be operated hydrodynamically. The disclosed bearing assemblies and apparatuses may be employed in bearing apparatuses for use in pumps, turbines, compressors, turbo expanders, or other mechanical systems.

In an embodiment, a bearing apparatus includes a first bearing assembly and a second bearing assembly. The first bearing assembly includes a first support ring and a plurality of tilting pads each of which includes a superhard bearing surface. Each tilting pad is tilted and/or tiltably secured relative to the first support ring. The second bearing assembly includes a continuous superhard bearing element. The continuous superhard bearing element includes a continuous superhard bearing surface generally facing the superhard bearing surface of each of the tilting pads. Additionally, the continuous superhard bearing element has a maximum lateral width greater than about 5.1 cm (about 2 inches).

In an embodiment, the continuous superhard bearing element or a superhard bearing element of at least one tilting pad may include polycrystalline diamond, or a sintered or reaction-bonded ceramic (e.g., reaction-bonded silicon carbide or reaction-bonded silicon nitride). In an embodiment, the continuous superhard bearing element or a superhard bearing element of at least one tilting pad may have a surface finish less than about 0.64 micrometers (μm) (about 25 microinches).

Other embodiments are related to methods of using and manufacturing bearing apparatuses including a first bearing assembly having a plurality of tilting pads and a second bearing assembly having a continuous superhard bearing element. In an embodiment, a method for manufacturing a bearing assembly is disclosed. A continuous superhard bearing element is formed that includes a continuous superhard bearing surface. A hole is formed generally in a center of the continuous superhard bearing element. A support ring is provided, which includes a recess configured to receive the continuous superhard bearing element. The continuous superhard bearing element is attached to the support ring such that the continuous superhard bearing element is secured in the recess of the support ring. The continuous superhard bearing surface of the continuous superhard bearing element is smoothed to exhibit a surface finish of less than 0.64 μm (about 25 microinches).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein relate to bearing assemblies and apparatuses, which may be operated hydrodynamically. The disclosed bearing assemblies and apparatuses may be employed in bearing apparatuses for use in pumps, turbines, compressors, turbo expanders, or other mechanical systems. Motor assemblies including at least one such bearing assembly or apparatus are also disclosed, as well as methods of using and fabricating such bearing assemblies and apparatuses utilizing superhard materials.

As will be discussed in more detail below, in one or more embodiments, a bearing apparatus includes a first bearing assembly and a second bearing assembly. The first bearing assembly includes a first support ring and a plurality of tilting pads each of which includes a superhard bearing surface. Each tilting pad is tilted and/or tiltably secured relative to the first support ring. The second bearing assembly includes a second support ring and a continuous superhard bearing element that is secured to the second support ring. The continuous superhard bearing element includes a continuous superhard bearing surface generally facing the superhard bearing surface of each of the tilting pads. In some embodiments, the continuous superhard bearing element has a maximum lateral width greater than about 5.1 cm (about 2 inches).

While the description herein provides examples relative to a pump or turbine bearing apparatus, the bearing assembly and apparatus embodiments disclosed herein may be used in any number of applications. For instance, the bearing assemblies and apparatuses may be used in subterranean drilling and motor assembly, motors, compressors, turbo expanders, generators, gearboxes, other systems and apparatuses, or combinations of the foregoing. Furthermore, the bearing assemblies and apparatuses may also be operated hydrodynamically, partially hydrodynamically, or not hydrodynamically, if desired or needed.

Figure 1A:
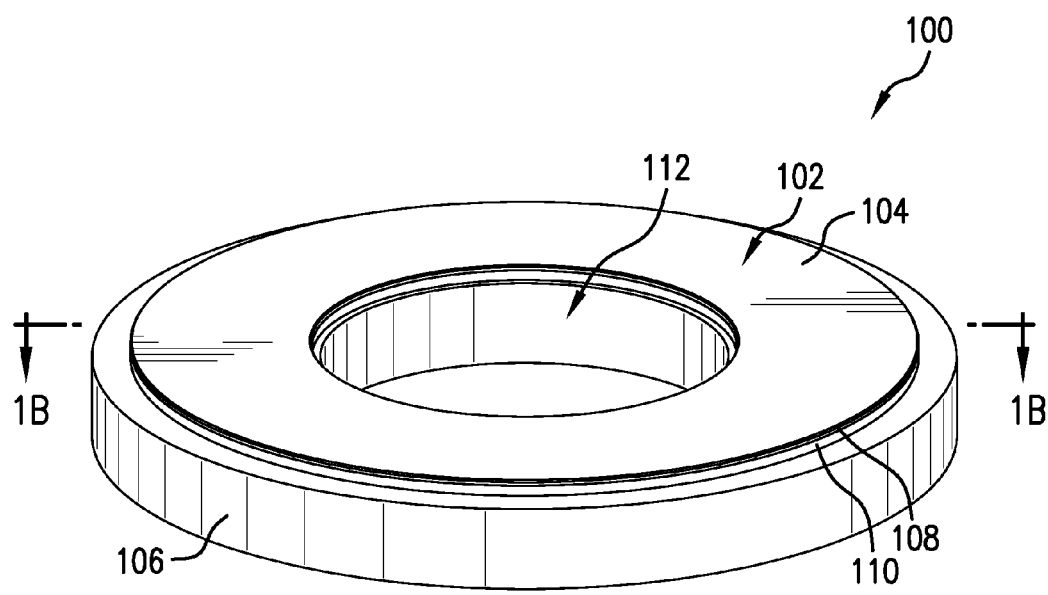
FIG. 1A is an isometric view of a bearing assembly including continuous superhard bearing element having a continuous superhard bearing surface according to an embodiment.
Figure 1B:
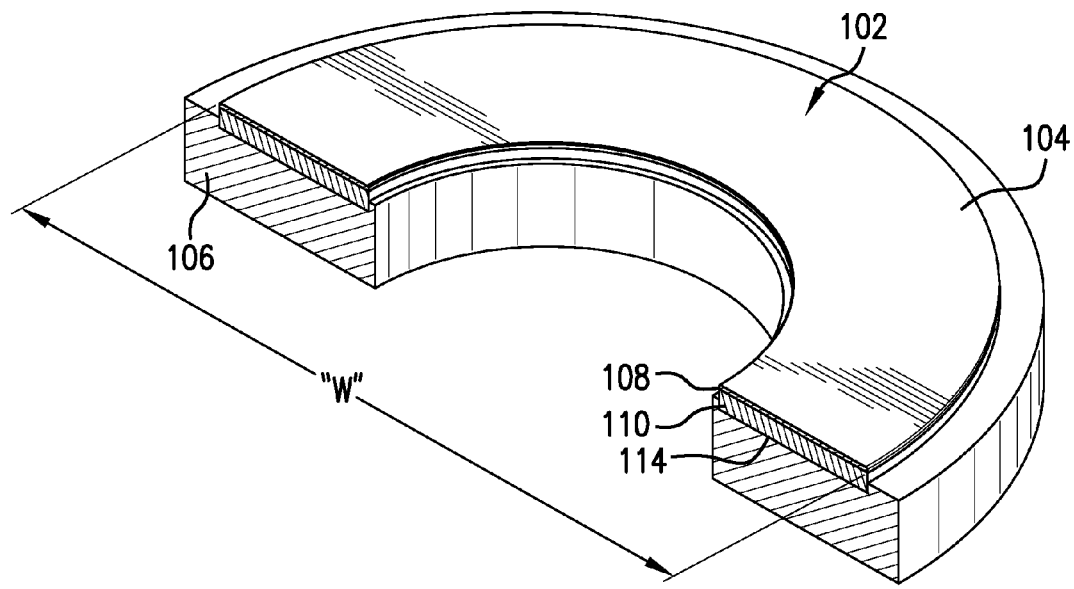
FIG. 1B is an isometric partial cross-sectional view taken along the line 1B-1B of the bearing assembly of FIG. 1A.

FIGS. 1A and 1B are isometric and isometric partial cross-sectional views, respectively, of a thrust-bearing assembly 100 including a continuous superhard bearing element 102 having a continuous superhard bearing surface 104. Such a configuration may improve wear performance as compared to an assembly in which the overall bearing surface is formed of a plurality of segmented, discontinuous bearing surfaces defined by individual bearing elements. Additionally, such a configuration may improve wear performance and manufacturing costs as compared to an assembly in which the overall bearing surface is formed of a plurality of segmented bearing elements that form a substantially continuous bearing surface. Wear performance may be improved because the substantial absence of any discontinuities in the overall bearing surface may minimize and/or prevent chipping and/or cracking of the continuous bearing surface 104, promote fluid film development, prevent fluid from leaking through seams formed between adjacent superhard bearing segments, increase fluid film strength, or combinations thereof.

The continuous superhard bearing element 102 includes a continuous superhard bearing surface 104. The continuous superhard bearing surface 104 has an integral construction such that a single superhard bearing element forms the full continuous superhard bearing surface 104. The continuous superhard bearing element 102 is attached to a support ring 106 in a fixed position. For example, the support ring 106 may define a recess 114 that receives the continuous superhard bearing element 102 partially therein. The continuous superhard bearing element 102 may be secured within the recess 114 to the support ring 106 by brazing, press-fitting, using fasteners, clamping, another type of mechanical attachment, another suitable technique, or combinations thereof. However, in other embodiments, the support ring 106 may be omitted.

The support ring 106 may be made from a variety of different materials. For example, the support ring 106 may comprise carbon steel, stainless steel, copper (e.g., brass or bronze alloys), tungsten carbide, or another suitable material.

The continuous superhard bearing surface 104 of the continuous superhard bearing element 102 may exhibit a relatively smooth surface finish. In an embodiment, a bearing apparatus includes a thrust-bearing assembly that includes continuous superhard bearing element 102 and another bearing assembly (e.g., a tilting pad bearing assembly). As the thrust-bearing assembly that includes the continuous superhard bearing element 102 rotates relative to the other bearing surface of the other bearing assembly, a fluid film may develop between the continuous superhard bearing surface 104 and the other bearing surface of the other bearing assembly, thereby increasing the wear resistance and/or performance of the bearing apparatus. A smooth surface finish may facilitate the formation of the fluid film between the bearing surfaces of the bearing apparatus. For example, a surface defect caused by a rough surface finish (e.g., a bump, a ridge, etc.) on the continuous superhard bearing surface 104 of the continuous superhard bearing element 102 may prevent the development of a sufficient fluid film at least proximate the defect. The surface defect may also increase the friction or contact between the bearing surfaces. Such conditions may result in chipping, power losses, cracking or increased wear on both bearing surfaces. As such, the continuous superhard bearing surface 104 of the continuous superhard bearing element 102 and/or the other bearing surface of the other bearing assembly may include a smooth surface finish. In an embodiment, the surface finish of the continuous superhard bearing surface 104 of the continuous superhard bearing element 102 or any other surface of the bearing apparatus (e.g., the tilting pad bearing assembly) may have a surface finish less than about 0.89 μm (about 35 μm) (e.g., less than about 0.64 μm (about 25 microinches), less than about 0.38 μm (about 15 microinches), less than about 0.25 μm (about 10 microinches), less than about 0.13 μm (about 5 microinches)) as measured, for example, by a profilometer by root mean square (RMS). In another embodiment, the surface finish of the continuous superhard bearing surface 104 of the continuous superhard bearing element 102 or any other surface of the bearing apparatus may have a surface finish of about 0.64 μm (25 microinches) to about 0.89 μm (about 35 microinches), about 0.38 μm (about 15 microinches) to about 0.64 μm (about 25 microinches), about 0.38 µm (about 15 microinches) to about 0.51 µm (about 20 microinches), about 0.25 µm (about 10 microinches) to about 0.38 µm (about 15 microinches), about 0.18 µm (about 7 microinches) to about 0.25 µm (about 10 microinches), about 0.13 µm (about 5 microinches) to about 0.18 µm (about 7 microinches), about 0.064 µm (about 2.5 microinches) to about 0.13 µm (about 5 microinches), less than about 0.064 µm (about 2.5 microinches), less than about 0.051 µm (about 2 microinches), less than about 0.025 µm (about 1 microinch), or submicrometers (submicroinches). The surface finish of any bearing surface of the bearing apparatuses disclosed herein may exhibit any of the disclosed surface finishes and may be selected based on the type of fluid used for lubrication of the bearing surfaces, the expected fluid pressure or flow through the bearing apparatus, the expected rate of rotation, the expected load in the bearing apparatus, the expected tilting of any tilting pad in a bearing assembly, other performance criteria, or combinations thereof.

The continuous superhard bearing element 102 may have a maximum lateral width "W," such as a maximum diameter. In an embodiment, the maximum lateral width "W" of the continuous superhard bearing element 102 is greater than about 5.1 cm (about 2 inches) (e.g., greater than about 7.6 cm (about 3 inches), greater than about 12.7 cm (about 5 inches). In another embodiment, the maximum lateral width "W" of the continuous superhard bearing element 102 is about 5.1 cm (about 2 inches) to about 7.6 cm (about 3 inches), about 7.6 cm (about 3 inches) to about 12.7 cm (about 5 inches), about 12.7 cm (about 5 inches) to about 17.8 cm (about 7 inches), about 17.8 cm (about 7 inches) to about 25.4 cm (about 10 inches), about 25.4 cm (about 10 inches) to about 30.5 cm (about 12 inches) (e.g., 28 cm (about 11 inches)), or about 30.5 cm (about 12 inches) to about 40.6 cm (about 16 inches). In some applications, the maximum lateral width "W" of the continuous superhard bearing element 102 may be less than about 5.1 cm (about 2 inches). The maximum lateral width "W" of the continuous superhard bearing element 102 may be limited at least partially based on the type of material used for the continuous superhard bearing element 102.

The continuous superhard bearing element 102 may be formed from of a variety of superhard materials. The term "superhard" means a material having a hardness at least equal to the hardness of tungsten carbide. In an embodiment, the continuous superhard bearing element 102 may include polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), other metal carbides, other superhard carbides, or combinations thereof. In another embodiment, the continuous superhard bearing element 102 may be composed of sintered or reaction-bonded silicon carbide, or sintered or reaction-bonded silicon nitride. The sintered or reaction-bonded silicon carbide, or the sintered or reaction-bonded silicon nitride may have additional materials therein. For example, the additional materials in a sintered or reaction-bonded ceramic may include diamond, polycrystalline diamond, cubic boron nitride, a material exhibiting a hardness greater than the sintered or reaction-bonded ceramic and/or a material exhibiting a thermal conductivity greater than the sintered or reaction-bonded ceramic. Adding materials to the sintered or reaction-bonded ceramic may increase the thermal conductivity and/or wear resistance of a superhard bearing element including the sintered or reaction-bonded ceramic. For example, adding diamond particles to sintered or reaction-bonded silicon carbide, or sintered or reaction-bonded silicon nitride may increase the wear resistance of the continuous superhard bearing element 102 by more than 500%. In an embodiment, the diamond particles may be added to the sintered or reaction-bonded ceramic in an amount less that about 80 weight % (e.g., about 50 weight % to about 80 weight %, about 25 weight % to about 50 weight %, or less than about 25 weight %). Suitable reaction-bonded ceramics from which the continuous superhard bearing element 102 may be made are commercially available from M Cubed Technologies, Inc. of Newark, Del. In an embodiment, the continuous superhard bearing element 102 may be formed from a single material or a single piece of any of the superhard materials disclosed herein.

In the illustrated embodiment, the continuous superhard bearing element 102 includes a superhard table 108 defining the continuous superhard bearing surface 104 and a substrate 110 to which the superhard table 108 is bonded. In an embodiment, the continuous superhard bearing element 102 may be a polycrystalline diamond compact ("PDC"). The PDC includes a polycrystalline diamond ("PCD") table defining the superhard table 108 to which the substrate 110 is bonded. For example, the substrate 110 may comprise a cobalt-cemented tungsten carbide substrate. The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of such the PCD table may include a metal-solvent catalyst or a metallic infiltrant disposed therein that is infiltrated from the substrate 110 or from another source. For example, the metal-solvent catalyst or metallic infiltrant may be selected from iron, nickel, cobalt, and alloys of the foregoing. The PCD table may further include thermally-stable diamond in which the metal-solvent catalyst or metallic infiltrant has been partially or substantially completely depleted from a selected surface or volume of the PCD table, for example, an acid leaching process.

For example, appropriately configured PDCs may be used as the continuous superhard bearing element 102, which may be formed in an HPHT processes. Suitable PDCs having a PCD table with a maximum diameter over 6.4 cm (about 2.5 inches) are commercially available from Iljin Diamond Co., Ltd. of Korea. For example, diamond particles may be disposed adjacent to the substrate 110, and subjected to an HPHT process to sinter the diamond particles to form the PCD table that bonds to the substrate 110, thereby forming the PDC. The temperature of the HPHT process may be at least about 1000° C. (e.g., about 1200° C. to about 1600° C.) and the cell pressure of the HPHT process may be at least 4.0 GPa (e.g., about 5.0 GPa to about 12 GPa or about 7.5 GPa to about 11 GPa) for a time sufficient to sinter the diamond particles.

The diamond particles may exhibit an average particle size of about 50 µm or less, such as about 30 µm or less, about 20 µm or less, about 10 µm to about 18 µm, or about 15 µm to about 18 µm. In some embodiments, the average particle size of the diamond particles may be about 10 µm or less, such as about 2 µm to about 5 µm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the mass of diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In one embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions.

More details about diamond particle sizes and diamond particle size distributions that may be employed to form the PCD table in any of the embodiments disclosed herein are disclosed in U.S. patent application Ser. No. 13/734,354; U.S. Provisional Patent Application No. 61/948,970; and U.S. Provisional Patent Application No. 62/002,001. U.S. patent application Ser. No. 13/734,354; U.S. Provisional Patent Application No. 61/948,970; and U.S. Provisional Patent Application No. 62/002,001 are each incorporated herein, in their entirety, by this reference.

In an embodiment, the superhard table 108 may be integrally formed with the substrate 110. For example, the superhard table 108 may be a sintered PCD table that is integrally formed with the substrate 110. In such an embodiment, the infiltrated metal-solvent catalyst from the substrate 110 may be used to catalyze formation of diamond-to-diamond bonding between diamond grains of the superhard table 108 from diamond powder during HPHT processing. In another embodiment, the superhard table 108 may be a pre-formed superhard table that has been HPHT bonded or brazed to the substrate 110 in a second HPHT process after being initially formed in a first HPHT process. For example, the superhard table 108 may be a pre-formed PCD table that has been leached to substantially completely remove metal-solvent catalyst used in the manufacture thereof and subsequently HPHT bonded or brazed to the substrate 110 in a separate process.

In some embodiments, the superhard table 108 may be leached to deplete a metal-solvent catalyst or a metallic infiltrant therefrom in order to enhance the thermal stability of the superhard table 108. For example, when the superhard table 108 is a PCD table, the superhard table 108 may be leached to remove at least a portion of the metal-solvent catalyst from a working region thereof to a selected depth that was used to initially sinter the diamond grains to form a leached thermally-stable region. The leached thermally-stable region may extend inwardly from the continuous superhard bearing surface 104 to a selected depth. In one example, the depth of the thermally-stable region may be about 10 μm to about 600 μm. More specifically, in some embodiments, the selected depth is about 50 μm to about 100 μm, about 200 μm to about 350 μm, or about 350 μm to about 600 μm. The leaching may be performed in a suitable acid, such as aqua regia, nitric acid, hydrofluoric acid, or mixtures of the foregoing.

The substrate 110 may also be formed from any number of different materials, and may be integrally formed with, or otherwise bonded or connected to, the superhard table 108. Materials suitable for the substrate 110 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 110 comprises cobalt-cemented tungsten carbide. However, in certain embodiments, the superhard tables 108 may be omitted, and the continuous superhard bearing element 102 may be made from a superhard material, such as cobalt-cemented tungsten carbide. In other embodiments, the substrate 110 may be omitted and the continuous superhard bearing element 102 may be a superhard material, such as a polycrystalline diamond body that has been leached to deplete metal-solvent catalyst therefrom or may be an un-leached PCD body.

A hole 112 may be formed in the continuous superhard bearing element 102 using a variety of techniques. The hole 112 may be sized and configured to receive a rotating shaft of pump, turbine, or another machine. In an embodiment, the hole 112 may be machined into a disk from which the continuous superhard bearing element 102 is made using electrical discharge machining (e.g., plunge electrical discharge machining and/or wire electrical discharge machining), drilling, laser drilling, other suitable techniques, or combinations thereof. For example, plunge electrical discharge machining may be used to create a small starter through hole in the disk from which the continuous superhard bearing element 102 is made. Wire electrical discharge machining may then be used to enlarge the small starter through hole to form the hole 112. In another example, a laser is used to create the small starter through hole or the laser may be used to form the hole 112. In another embodiment, a sacrificial material that is more easily removed than the superhard material from which the continuous superhard bearing element 102 is made may be used to define the hole 112 of the continuous superhard bearing element 102. For example, a sacrificial material (e.g., tungsten, tungsten carbide, hexagonal boron nitride, or combinations thereof) is laterally surrounded by unsintered diamond particles and is then subjected to an HPHT process. The sacrificial material is then removed from the PCD table so formed (e.g., mechanically, by blasting or via a leaching process) from the PCD surrounding it to form the hole 112.

In another embodiment, the continuous superhard bearing element 102 may include a coating that forms the continuous superhard bearing surface 104. The coating may be formed using a chemical vapor deposition technique, a physical vapor deposition technique, or any other deposition technique. For example, diamond may be deposited on a less hard surface to form the continuous superhard bearing surface 104 using a chemical or physical vapor deposition technique.

Figure 2A:
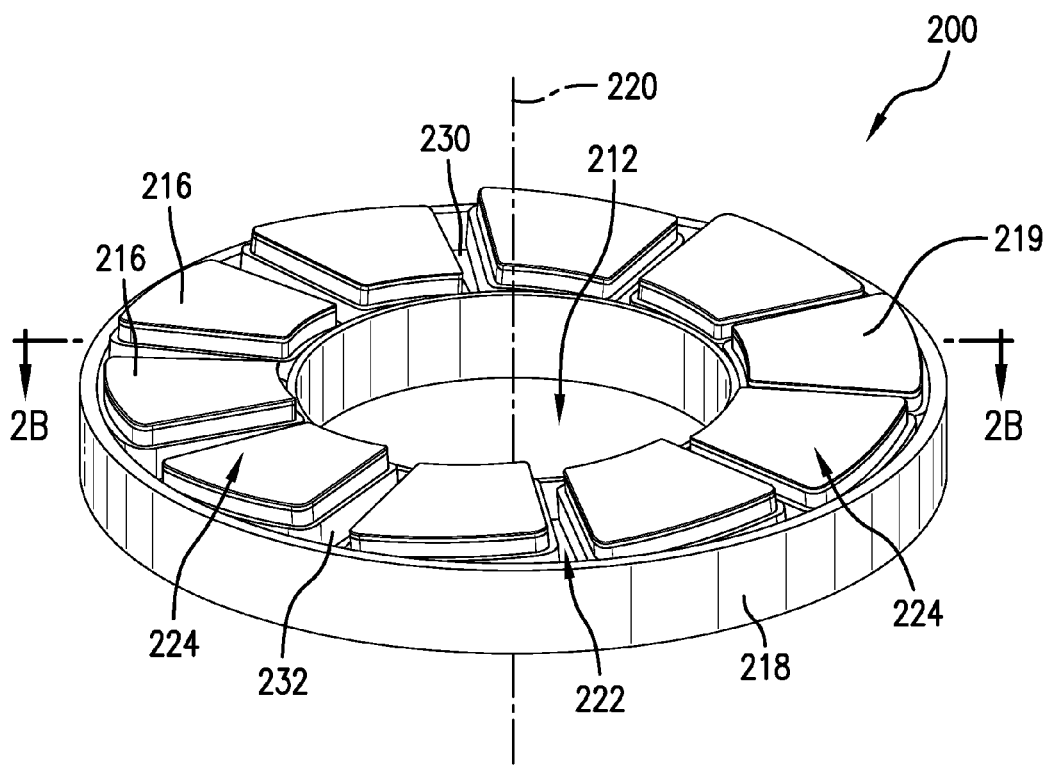
FIG. 2A is an isometric view of a tilting pad thrust-bearing assembly according to an embodiment.
Figure 2B:
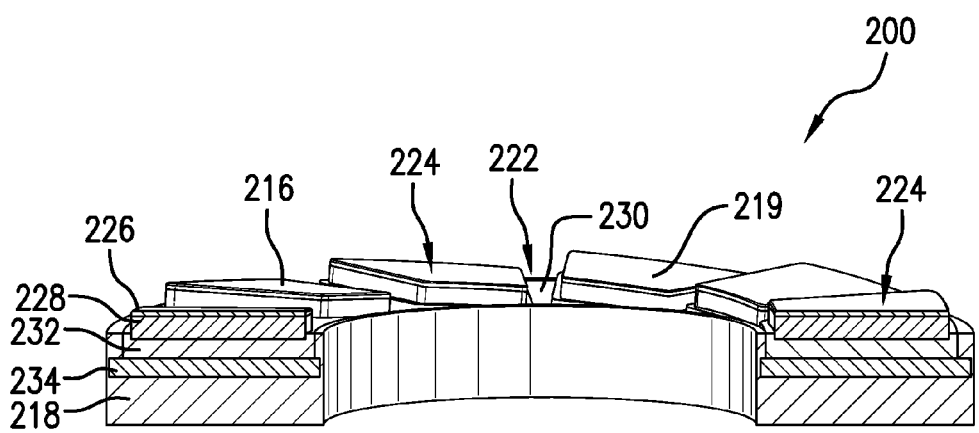
FIG. 2B is an isometric partial cross-sectional view taken along line 2B-2B of the tilting pad thrust-bearing assembly shown in FIG. 2A.

FIGS. 2A and 2B are isometric and isometric partial cross-sectional views, respectively, of a tilting pad thrust-bearing assembly 200 according to an embodiment. The tilting pad thrust-bearing assembly 200 includes a support ring 218 that carries a plurality of circumferentially spaced tilting pads 216. The tilting pads 216 may include, for instance, fixed tilting pads, adjustable tilting pads, self-establishing tilting pads, other bearing pads or elements, or combinations of the foregoing. Examples of tilting pad thrust-bearing assemblies for the tilting pad thrust-bearing assembly 200 are disclosed in U.S. Pat. No. 8,545,103, the disclosure of which is incorporated herein, in its entirety, by this reference.

Each of the tilting pads 216 includes a superhard bearing surface 219. In the illustrated embodiment, the superhard bearing surface 219 of each of the tilting pads 216 generally may exhibit a truncated pie-shaped geometry or a generally trapezoidal geometry.

The tilting pads 216 may be distributed about a thrust axis 220, along which a thrust force may be generally directed during use. Each tilting pad 216 may be located circumferentially adjacent to another tilting pad 216, with a circumferential space 222 or other offset therebetween. For instance, the circumferential space 222 may separate adjacent tilting pads 216 by a distance of about 2.0 mm to about 20.0 mm, or a distance of about 3.5 mm to about 15 mm, although the separation distance may be greater or smaller. For instance, as the size of the tilting pad thrust-bearing assembly 200 increases, the size of the tilting pads 216 and/or the size of the circumferential space 222 may also increase. For example, the tilting pads 216 may exhibit a nominal radial width less than about 7.6 cm (about 3 inches) (e.g., less than about 5.1 cm (about 2 inches), less than about 2.5 cm (about 1 inch), less than 1.3 cm (about 0.5 inches), between 0.64 cm (about 0.25 inches) to about 1.3 cm (about 0.5 inches), between about 1.3 cm (about 0.5 inches) to about 2.5 cm (about 1 inch), between about 2.5 cm (about 1 inch) to about 5.1 cm (about 2 inches)). In other embodiment, the tilting pads 216 may exhibit a nominal radial width greater than about 7.6 cm (about 3 inches).

Each tilting pad 216 may include a discrete superhard bearing element 224. As such, the superhard bearing surfaces 219 of the tilting pads 216 collectively form a non-continuous superhard bearing surface. The superhard bearing element 224 may include a superhard table 226 that may be bonded to a substrate 228. For example, the superhard bearing element 224 may be formed from any of the superhard materials and compacts previously described with respect to the continuous superhard bearing element 102 (FIGS. 1A-1B).

To support the tilting pads 216 of the tilting pad thrust-bearing assembly 200, the support ring 218 may define a channel 230 and the tilting pads 216 may be placed within the channel 230. In other embodiments, the support ring 218 may define multiple pockets or otherwise define locations for the tilting pads 216. The tilting pads 216 may then be supported or secured within the support ring 218 in any suitable manner. For instance, as discussed hereafter, a pivotal connection may be used to secure the tilting pads 216 within the support ring 218, although any other suitable securement or attachment mechanism may also be utilized. The support ring 218 may also include an inner, peripheral surface defining a hole 212. The hole 212 may be generally centered about the thrust axis 220, and may be adapted to receive a shaft (e.g., a downhole drilling motor shaft). The support ring 218 may be formed of the same materials as the support ring 106 (FIGS. 1A-1B).

In the illustrated embodiment, the tilting pad thrust-bearing assembly 200 includes 10 tilting pads 216. In other embodiments, more or less than 10 tilting pads 216 may be used in the tilting pad thrust-bearing assembly 200. For example, between 3 to 16 tilting pads 216 (e.g., 3 to 6, 6 to 8, 8 to 10, or 10 to 12) may be included in the tilting pad thrust-bearing assembly 200. The number of tilting pads 216 included in the tilting pad thrust-bearing assembly 200 may be chosen based on the expected load, the superhard materials of the continuous superhard bearing element 102 and the superhard bearing element 224, the size of the continuous superhard bearing element 102, and the desired life of the bearing apparatus.

In the embodiment illustrated in FIGS. 2A and 2B, the tilting pads 216 may be used in connection with a runner or other superhard bearing element (e.g., the continuous superhard bearing element 102 shown in FIG. 1A). In general, the tilting pad thrust-bearing assembly 200 may rotate relative to a runner or another bearing assembly, while a lubricant or other fluid (e.g., seawater) floods the tilting pad thrust-bearing assembly 200 and the runner/other bearing assembly. For example, as the runner (e.g., thrust-bearing assembly 100 of FIG. 1A) is rotated relative to a tilting pad thrust-bearing assembly 200, a fluid film separating the runner/other bearing assembly from the superhard bearing elements 224 may develop. For favorable use of the hydrodynamic forces within the lubricant, the tilting pads 216 may tilt which may result in a higher lubricant film thickness existing at a leading edge (i.e., an edge of a tilting pad 216 that would be traversed first by a reference line on the runner while the runner moves in the direction of rotation), than at a trailing edge (i.e., an edge of a tilting pad 216 over which such reference line is second to pass in the direction of rotation), at which or near which a minimum film thickness may develop. The tilting pads 216 may be manufactured such that respective superhard bearing surfaces 219 thereof exhibit the same or similar smooth surface finishes as the continuous superhard bearing element 102, as previously described. Of course, in other embodiments, the tilting pad thrust-bearing assembly 200 may rotate with respect to the runner, if desired, without limitation.

In the illustrated embodiment, each of the plurality of superhard bearing elements 224 is secured to a support plate 232 (FIG. 2B). The support plate 232 may, for example, be formed of a metal, an alloy (e.g., steel), a cemented carbide material, other material, or any combination thereof. In some embodiments, the support plate 232 may be formed of a material that is relatively softer than the substrate 228, such that the support plate 232 may be relatively easily machined or formed into a desired shape or form. The substrate 228 of the superhard bearing element 224 may be secured to the support plate 232 by brazing, welding, or other method. In some embodiments, the support plate 232 may define a pocket into which the superhard bearing elements 224 segments may be tiltably or fixedly assembled and/or positioned. In an embodiment, the support plate 232 has an integral construction such that a single body may form substantially the full support plate 232. In other embodiments, multiple segments of one or more materials may be used to form or define the support plate 232. In another embodiment, multiple superhard bearing segments may be used to form the superhard bearing element 224.

The degree to which the tilting pads 216 rotate or tilt may be varied in any suitable manner. For instance, in an embodiment, the tilting pads 216 may be tilted about respective radial axes that extend generally radially from the thrust axis 220. In FIG. 2B, the support plate 232 may be attached to a pin 234. The pin 234 may, for example, be formed of a metal, an alloy, a cemented carbide material, other material, or any combinations thereof. The pin 234 may be allowed to at least partially rotate, or may otherwise define or correspond to a tilt axis 236. For example, according to some embodiments, the pin 234 is journaled or otherwise secured within the support ring 218 in a manner that allows the pin 234 to rotate relative to the support ring 218. The pin 234 may be fixed to the support plate 232 such that as the pin 234 rotates relative to the support ring 218, the support plate 232 may also rotate or tilt relative to the tilt axis 236 of the pin 234. The pin 234 and support plate 232 may rotate or tilt between zero and twenty degrees in some embodiments, such that the superhard bearing element 224 of the respective tilting pads 216 may also tilt between about zero and about twenty degrees relative to the pin 234 or other horizontal axis. In other embodiments, the pin 234 and/or the superhard bearing element 224 may rotate between about zero and about fifteen degrees, such as a positive or negative angle (Θ) of about 0.5 to about 3 degrees (e.g., about 0.5 to about 1 degree or less than 1 degree) relative to the tilt axis 236 of the pin 234. In some cases, the support ring 218 may be configured for bidirectional rotation. In such a case, the pin 234 may be allowed to rotate in clockwise and/or counter-clockwise directions. For example, the superhard bearing element 224 may thus tilt in either direction relative to the tilt axis 236 of the pin 234 and/or the support ring 218. For instance, the superhard bearing element 224 may be rotated to a position anywhere between a positive or negative angle of about twenty degrees relative to an axis of the pin 234, such as a positive or negative angle (θ) of about 0.5 to about 3 degrees (e.g., about 0.5 to about 1 degree or less than 1 degree) relative to the tilt axis 236 of the pin 234.

The pin 234 may be used to allow one or more tilting pads 216 to selectively rotate. For instance, the tilting pads 216 may be self-establishing or limiting such that the tilting pads 216 may automatically or otherwise adjust to a desired tilt or other orientation based on the lubricant used, the axial forces applied along the thrust axis 220, the rotational speed of the runner and/or the tilting pad thrust-bearing assembly 200, other factors, or combinations of the foregoing. In still other embodiments, the tilting pads 216 may be fixed at a particular tilt, or may be manually set to a particular tilt with or without being self-establishing.

Further, the pin 234 represents a single mechanism for facilitating rotation, translation, or other positioning of the tilting pads 216. In other embodiments, other mechanisms may be used. By way of illustration, leveling links, pivotal rockers, spherical pivots, other elements, or any combination of the foregoing may also be used to facilitate positioning of the tilting pads 216 in a tilted configuration. In an embodiment, the support plate 232 may be used to facilitate rotation of a respective tilting pad 216. The support plate 232 may, for instance, be machined or otherwise formed to include a receptacle, an opening, or other structure into which the pin 234 may be at least partially received or secured. In embodiments in which the pin 234 is excluded, the support plate 232 may be machined or otherwise formed to include other components, such as spherical pivot, pivotal rocker, or leveling link interface. In other embodiments, the support plate 232 can be eliminated and the substrate 228 may be directly machined or formed to facilitate tilting of the tilting pad 216. Examples of tilting mechanisms that may be used for tilting the tilting pads disclosed herein are disclosed in U.S. Patent Published Application No. 20140102810, the disclosure of which is incorporated herein, in its entirety, by this reference.

In some embodiments, the tilt axis 236 of the tilting pads 216 may be aligned with a radial reference line dividing (e.g., symmetrically) the superhard bearing surface 219. For example, when the support ring 218 may be configured for bi-directional rotation, the tilt axis 236 of the tilting pads 216 may be centered circumferentially between opposing edges of the tilting pads 216 (e.g., the leading edge and the trailing edge). In other embodiments, the tilt axis 236 of a tilting pad 216 may be offset relative to a center of the superhard bearing surface 219 of the tilting pad 216. For example, where the support ring 218 is part of a rotor configured for only unidirectional rotation, the tilt axis 236 may be offset such that the tilt axis 236 is closer to one of the leading edge or the trailing edge of the tilting pad 216. In other embodiments, the tilt axis 236 may be offset from a circumferential center of its superhard bearing surface 219 despite a rotor being configured for bidirectional rotation, or the tilt axis 236 may be circumferentially centered despite a rotor being configured for unidirectional rotation.

Figure 2C:
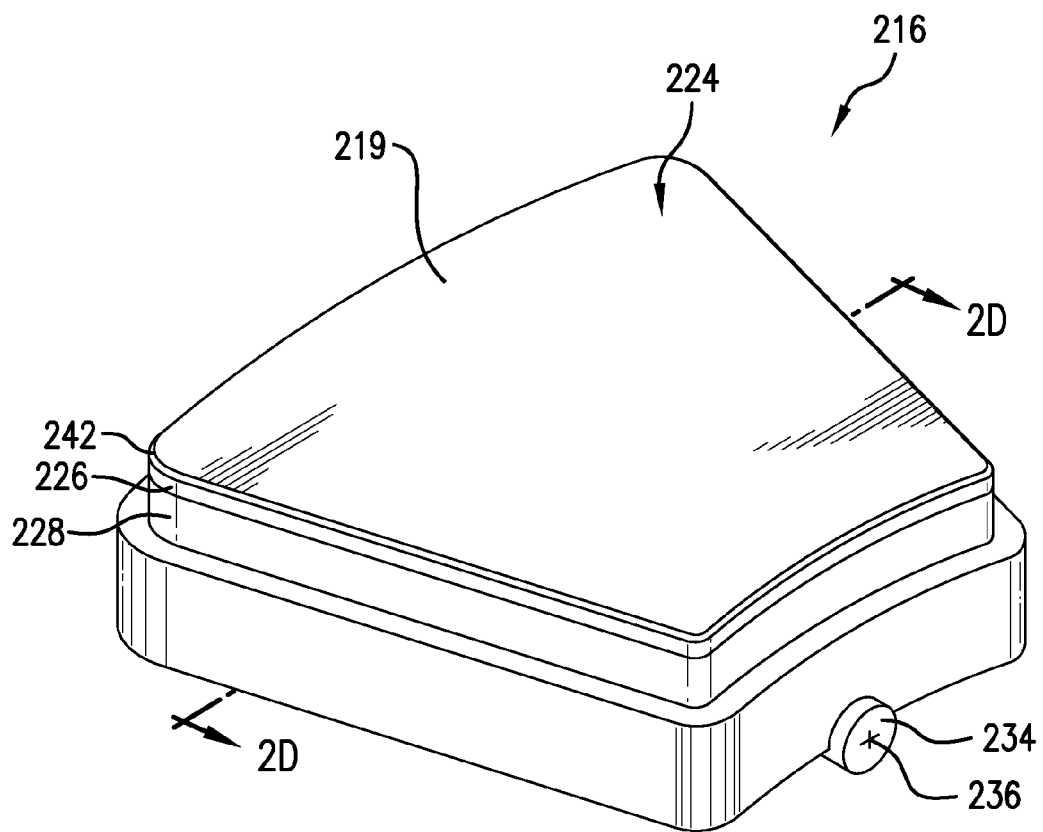
FIG. 2C is an isometric view of one of the tilting pads shown in FIGS. 2A and 2B, with the tilting pad having a single superhard bearing surface according to an embodiment.
Figure 2D:
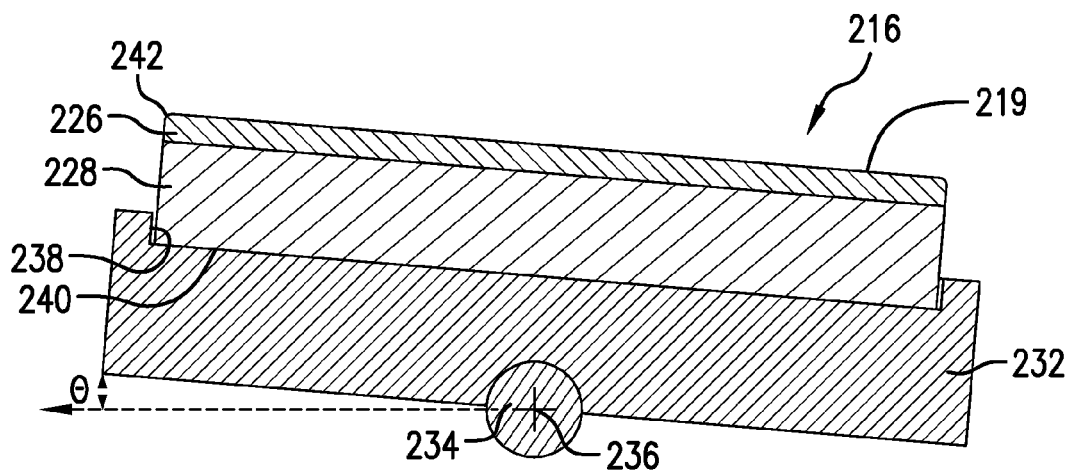
FIG. 2D is a cross-sectional view taken along line 2D-2D of the bearing tilting pad shown in FIG. 2C.

FIGS. 2C and 2D are isometric and cross-sectional views, respectively, of a single one of the tilting pads 216 shown in FIGS. 2A and 2B that may be used in connection with the tilting pad thrust-bearing assembly 200 described above. The tilting pad 216 includes a single superhard bearing element 224. As previously discussed, each tilting pad 216 may include the superhard table 226 bonded to the substrate 228, and the substrate 228 may further be secured within the support plate 232 by brazing, using high temperature adhesives, press-fitting, fastening with fasteners, or other suitable attachment mechanism. In the illustrated embodiment, the support plate 232 may facilitate attachment of the substrate 228 to the support plate 232 by including an interior surface 238 that defines an interior pocket 240. The interior pocket 240 may be sized to generally correspond to a size of the substrate 228. It is noted that the illustrated support plate 232 merely represents one embodiment for a support plate and other configurations may be used. For example, according to another embodiment, a support plate 232 may lack a pocket or other receptacle. In still another embodiment, the support plate 232 may be eliminated.

In the illustrated embodiment, a superhard bearing surface 219 of the superhard bearing element 224 (e.g., the superhard table 226) is substantially planar, although such an embodiment is merely illustrative. In other embodiments, the superhard bearing surface 219 may be curved, or have another contour or topography. Moreover, outer edges of the superhard bearing element 224 may optionally include a chamfer 242. The chamfer 242 may be formed by placing a chamfer on the individual outer edge regions of the superhard bearing element 224 or, if present, the superhard table 226. The superhard bearing element 224 may also take a number of other forms. For example, in FIG. 2C, the superhard bearing surface 219 is substantially pie-shaped with a chamfered edge 242. In other embodiments, the edges of a superhard bearing element 224 may define other shapes, including radiused, arcuate, generally circular, generally elliptical, generally trapezoidal, other shaped surfaces, may form a sharp edge, or combinations thereof.

Figure 3:
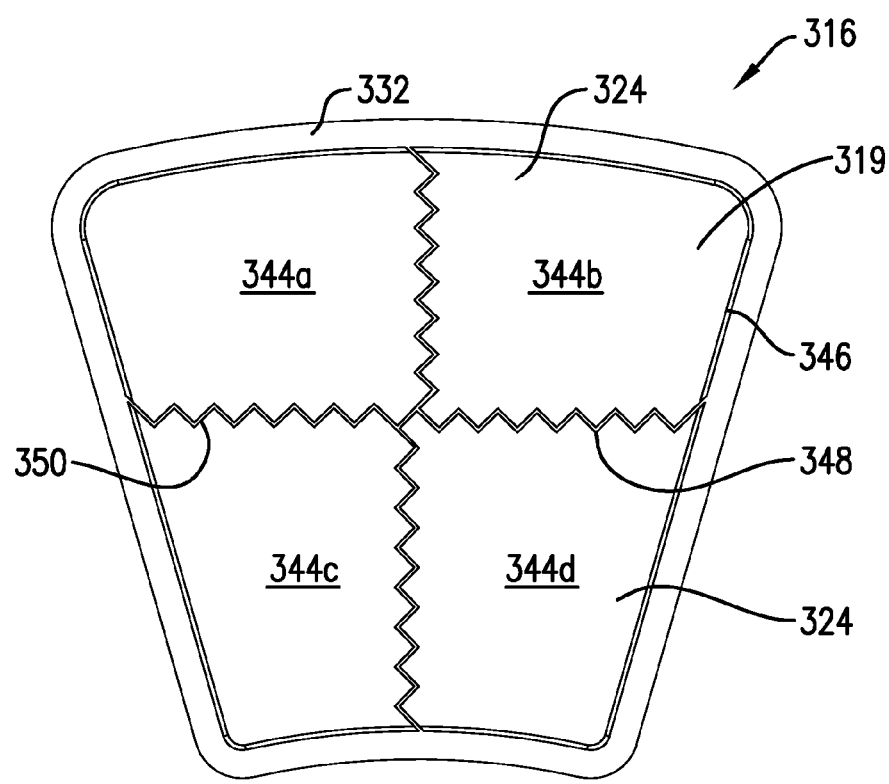
FIG. 3 is a top plan view of a tilting pad including multiple segments having serrated ends that form seams between the multiple segments according to another embodiment.
Figure 4:
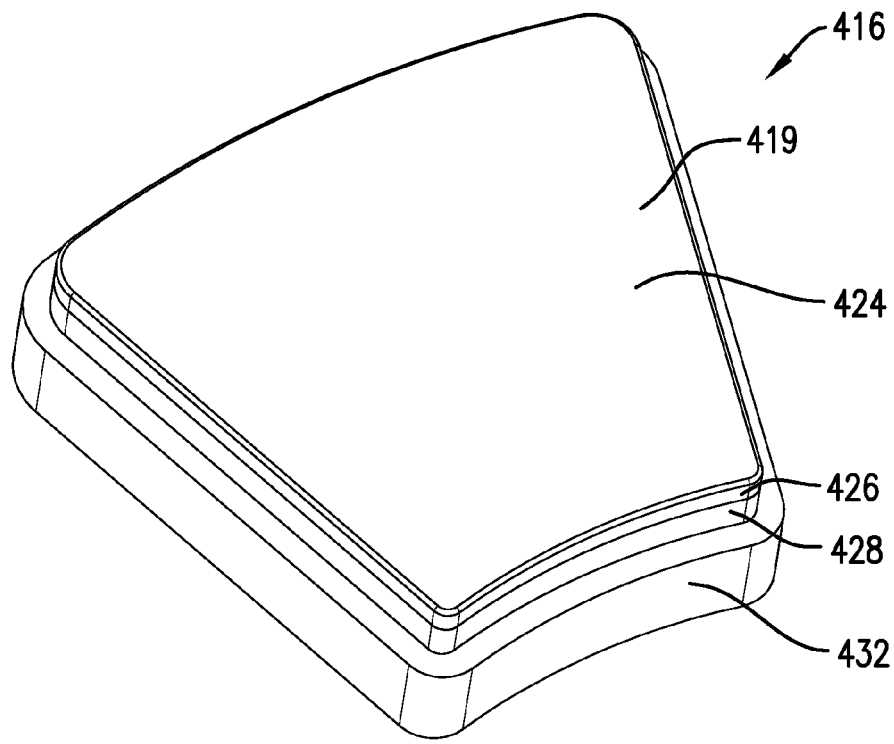
FIG. 4 is an isometric view of a tilting pad comprising a single superhard bearing element according to another embodiment.

FIGS. 3 and 4 illustrate top plan and isometric views, respectively, of different embodiments of tilting pads that may be employed in a tilting pad thrust-bearing assembly (e.g., tilting pad thrust-bearing assembly 200 of FIG. 2A) according to an embodiment. FIG. 3 illustrates a tilting pad 316 that may include a plurality of superhard bearing segments 344a-d, each of which includes a superhard bearing element 324 that may include a superhard table bonded to a substrate (not shown). The superhard table and substrate are optionally bonded or otherwise connected to a support plate 332. Each superhard table includes a superhard bearing surface 319 that collectively form a larger, substantially continuous superhard bearing surface.

The superhard bearing segments 344a-d may each include an outer edge region 346 and an interior edge region 348. The superhard bearing segments 344a-d may be configured with a serrated geometry at the interior edge regions 348. Such a configuration may allow adjacent superhard bearing segments 344a-d to mate and at least partially interlock, while also defining seams 350 exhibiting a geometry that limits fluid leakage radially through the gaps between adjoining superhard bearing segments 344a-d.

The illustrated and described seams 350 between adjacent superhard bearing segments 344 are merely illustrative, and seams 350 between superhard bearing segments 344 and/or configurations of interior edge regions 348 of superhard bearing segments 344 may have any number of configurations. For, instance, a set of interconnecting superhard bearing segments may have substantially straight, serrated, saw-toothed, sinusoidal-like, curved, or otherwise shaped interior edge regions, or any combination of the foregoing. Moreover, some portions of an interior edge region may have one configuration of shape while another portion of an interior edge region on the same superhard bearing segment may have a different configuration or shape. Accordingly, different superhard bearing segments may also include different mating geometry or other configurations. The plurality of superhard bearing segments 344a-d may have a coating (not shown) thereon that at least partially fills the seams 350. The coating may be applied using chemical vapor deposition, physical vapor deposition, other deposition techniques, or combinations thereof. Additionally, sealant materials may at least partially fill the seams 350, such as braze alloy, tungsten carbide, polycrystalline diamond, other ceramic materials, or combinations thereof.

As discussed herein, a tilting pad thrust-bearing assembly including superhard bearing segments may be utilized where certain conditions are met, or in any number of other circumstances or industries. For instance, an application may be identified where it would benefit to use a superhard bearing element including a superhard material. However, the superhard material may have associated production limits (e.g., size, availability, etc.). Where the superhard bearing element has a size, shape, or other feature(s) exceeding such production limits, the superhard bearing element may be fashioned out of multiple individual segments that collectively define a superhard bearing surface of the superhard bearing element. In other cases, however, the type of material used in the superhard bearing element may not have the same production limits as PDCs or other superhard materials, or the superhard bearing element may be sized small enough to allow a single superhard or other material to be used to form the superhard bearing surface.

FIG. 4 illustrates an embodiment in which a tilting pad 416 may have a size and/or comprise a material configured such that a single segment may form a single superhard bearing element 424 having a single superhard bearing surface 419. In particular, the tilting pad 416 may include a superhard table 426 bonded to a substrate 428. The substrate 428 may in turn be bonded to a support plate 432. Optionally, the support plate 432 is oversized relative to the substrate 428; however, the support plate 432 may also be about the same size or smaller than the substrate 428. In this embodiment, a single element may define substantially the entire superhard bearing element 424. For instance, the element may exhibit a length and/or width that may measure approximately 15 mm by 10 mm, such that a single superhard table 426 made from polycrystalline diamond or other materials may be fashioned into the desired shape, even in the absence of providing multiple interlocking, adjoining, or adjacent segments. In other embodiments, the element may have other sizes and may even exceed a maximum size available for PDCs. For instance, other superhard materials (e.g., tungsten carbide, reaction-bonded ceramics, reaction-bonded ceramics containing diamond particles) or any other superhard material disclosed herein may be used to form the superhard bearing element 424 using a single, integral segment.

Figure 5A:
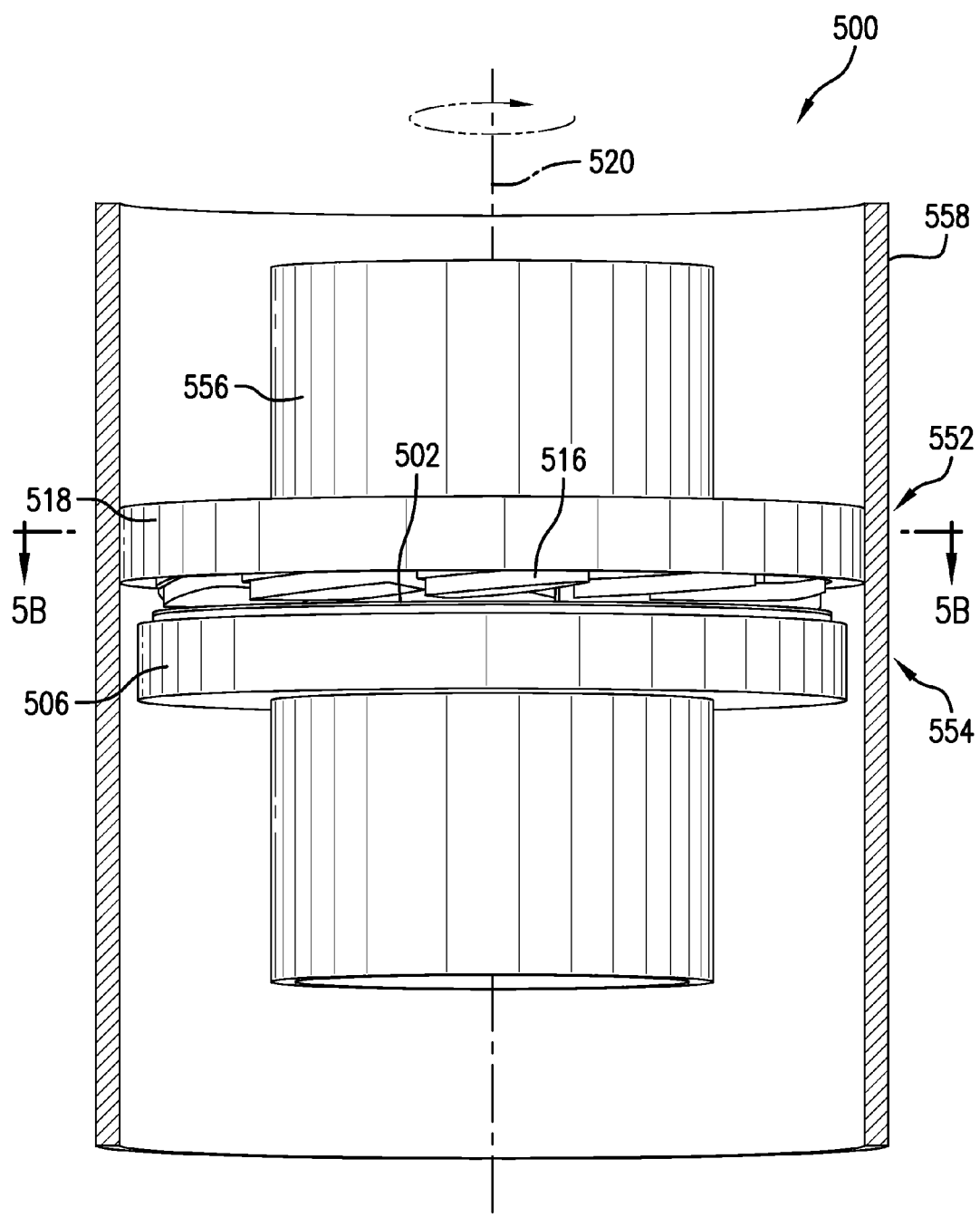
FIG. 5A is an isometric cutaway view of an embodiment of a thrust-bearing apparatus that may include a rotor having continuous superhard bearing element and a stator including tilting pads, with a housing shown in cross-section.
Figure 5B:
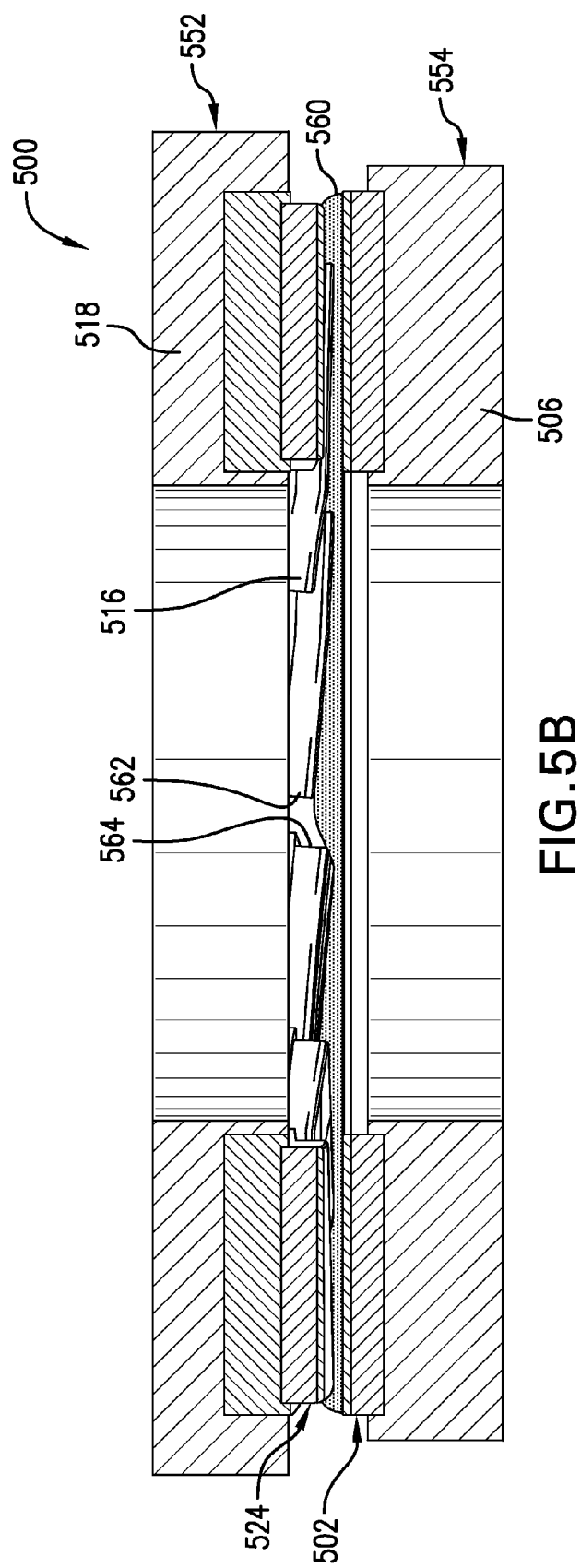
FIG. 5B is a partial cross-sectional schematic representation of the thrust-bearing apparatus of FIG. 5A during use taken along line 5B-5B thereof showing a fluid film that develops between the tilting pads of the stator and the continuous superhard bearing element of the rotor.

Any of the above-described embodiments including a thrust-bearing assembly having a continuous superhard bearing element and/or a tilting pad thrust-bearing assembly may be employed in a thrust-bearing apparatus. For example, a thrust-bearing apparatus may include a rotor configured as the thrust-bearing assembly 100 and a stator configured as the tilting pad thrust-bearing assembly 200, although any combination of the thrust-bearing assemblies with the continuous superhard bearing element and a tilting pad may be employed in other embodiments. FIG. 5A is an isometric cutaway view of a thrust-bearing apparatus 500 according to an embodiment. FIG. 5B is a partial cross-sectional schematic representation of the thrust-bearing apparatus 500 during use. One of the bearing assemblies of the thrust-bearing apparatus 500 is a stator while the other bearing assembly is a rotor. In the illustrated embodiment, the tilting pad thrust-bearing assembly is a stator 552 and the thrust-bearing assembly having the continuous superhard bearing element is a rotor 554. The stator 552 and rotor 554 may be configured as any of the described embodiments of bearing assemblies. The terms "rotor" and "stator" refer to rotating and stationary components of the tilting pad thrust-bearing apparatus 500, respectively, although the rotating and stationary status of the illustrated embodiments may also be reversed.

The stator 552 may include a support ring 506 and a plurality of tilting pads 516 mounted or otherwise attached to a support ring 518, with each of the tilting pads 516 having a superhard bearing element 524. The tilting pads 516 may be tilted and/or tilt relative to a rotational axis 520 of the thrust-bearing apparatus 500 and/or one or more surfaces of the support ring 506. The tilting pads 516 may be fixed at a particular tilt, may be manually adjusted to exhibit a particular tilt, may self-establish at a particular tilt, or may be otherwise configured.

The rotor 554 may be configured in any suitable manner, including in accordance with any of the embodiments described herein. The rotor 554 may include a support ring 506 connected to continuous superhard bearing element 502. The continuous superhard bearing element 502 of the rotor 554 is generally adjacent to and faces the superhard bearing elements 524 of the stator 552. A fluid film may develop between the continuous superhard bearing element 502 of the rotor 554 and the superhard bearing element 524 of the stator 552. The continuous superhard bearing element 502 may be mounted or otherwise attached to a support ring 518 by brazing, a press-fit, mechanical fasteners, or in another manner.

As shown in FIG. 5A, a shaft 556 may be coupled to the support ring 506 and operably coupled to an apparatus capable of rotating the shaft 556 in a direction R (or in an opposite direction). For example, the shaft 556 may extend through and may be secured to the support ring 506 of the rotor 554 by press-fitting or a threaded connection that couples the shaft 556 to the support ring 506, or by using another suitable technique. A housing 558 may be secured to the support ring 518 of the stator 552 by, for example, press-fitting or threadly coupling the housing 558 to the support ring 518, and may extend circumferentially about the shaft 556, the stator 552, and the rotor 554.

The operation of the thrust-bearing apparatus 500 is discussed in more detail with reference to FIG. 5B. FIG. 5B is a partial cross-sectional schematic representation in which the shaft 556 and housing 558 are not shown for clarity. In operation, lubrication, drilling fluid, mud, or some other fluid may be pumped between the shaft 556 and the housing 558, and between the tilting pads 516 of the stator 552 and the continuous superhard bearing element 502 of the rotor 554. More particularly, rotation of the rotor 554 at a sufficient rotational speed may sweep the fluid onto superhard bearing elements 524 of the stator 552 and may allow a fluid film 560 to develop between the continuous superhard bearing element 502 of the rotor 554 and the superhard bearing element 524 of the stator 552. The fluid film 560 may develop under certain operational conditions in which the rotational speed of the rotor 554 is sufficiently great and the thrust load is sufficiently low.

In an embodiment, the tilting pads 516 may be positioned at a fixed tilt angle or at a configurable or self-establishing tilt angle. The tilting pads 516 of the stator 552 may have a leading edge 562 at a different position than a trailing edge 564 relative to the rotor 554. For instance, in FIG. 5B, the tilting pads 516 may be tilted such that a greater separation exists between the tilting pads 516 and the continuous superhard bearing element 502 at a leading edge 562 (illustrated on one tilting pad 516) than at a trailing edge 564 (illustrated on another tilting pad 516, for clarity). Under such circumstances, the fluid film 560 may have a variable thickness across the tilting pad 516. In this particular embodiment, a higher fluid film 560 thickness may exist at the leading edge 562 than at the trailing edge 564.

Under certain operational conditions, the pressure of the fluid film 560 may be sufficient to substantially prevent contact between the continuous superhard bearing element 502 of the rotor 554 and the superhard bearing elements 524 of the stator 552 and thus, may substantially reduce wear of the continuous superhard bearing element 502 and the superhard bearing elements. When the thrust loads exceed a certain value and/or the rotational speed of the rotor 554 is reduced, the pressure of the fluid film 560 may not be sufficient to substantially prevent the continuous superhard bearing element 502 of the rotor 554 and the superhard bearing elements 524 of the stator 552 from contacting each other. Under such operational conditions, the thrust-bearing apparatus 500 is not operated as a hydrodynamic bearing. Thus, under certain operational conditions, the thrust-bearing apparatus 500 may be operated as a hydrodynamic bearing apparatus and under other conditions the thrust-bearing apparatus 500 may be operated so that the continuous superhard bearing element 502 and superhard bearing elements 524 of the tilting pad 516 contact each other during use or a partially developed fluid film is present between the continuous superhard bearing element 502 and superhard bearing elements 524 of the tilting pad 516. However, the superhard bearing elements 524 of the tilting pads 516 and continuous superhard bearing element 502 may comprise superhard materials that are sufficiently wear-resistant to accommodate repetitive contact with each other, such as during start-up and shut-down of a system employing the thrust-bearing apparatus 500 or during other operational conditions not favorable for forming the fluid film 560. In still other embodiments, a backup roller or other bearing (not shown) may also be included for use during certain operational conditions, such as during start-up, or as the fluid film 560 develops.

In an embodiment, the continuous superhard bearing element 502 and one or more of the tilting pads 516 may be formed from different materials. For example, the continuous superhard bearing element 502 may be formed from any of the reaction-bonded ceramics disclosed herein (e.g., reaction-bonded silicon carbide or reaction-bonded silicon nitride with or without diamond) and the superhard bearing elements 524 of at least some of the tilting pads 516 may be formed from a PDC or any other type of polycrystalline diamond element disclosed herein. Because the superhard bearing surface of the continuous superhard bearing element 502 and one or more of the tilting pads 516 may include different materials, a non-diamond bearing surface may wear preferentially relative to wear of a polycrystalline diamond bearing surface. Providing such a bearing assembly including different materials for the bearing surfaces thereof may provide for better heat transfer and better maintenance of the fluid film 560 between the superhard bearing surfaces of the continuous superhard bearing element 502 and the superhard bearing elements 524 of at least some of the tilting pads 516 than if all the superhard bearing surfaces included the same non-diamond superhard material (e.g., where both include silicon carbide).

Polycrystalline diamond and reaction-bonded ceramics containing diamond particles have substantially higher thermal conductivity than superhard carbides, such as sintered silicon carbide, reaction-bonded silicon carbide, or tungsten carbide. Because one of the superhard bearing surfaces of the continuous superhard bearing element 502 or the superhard bearing elements 524 of at least some of the tilting pads 516 includes polycrystalline diamond or reaction-bonded ceramics containing diamond particles, heat generated during use (e.g., at non-diamond bearing surfaces) may be better dissipated as a result of its proximity or contact with polycrystalline diamond bearing surfaces. Thus, a bearing assembly including a polycrystalline diamond or reaction-bonded ceramics containing diamond particles forming at least one of the bearing surfaces may provide increased wear resistance as compared to a bearing assembly in which all the bearing surfaces include a non-diamond superhard materials (e.g., silicon carbide), but at significantly lower cost than would be associated with a bearing assembly in which both of the opposed bearing surfaces include only polycrystalline diamond.

In an embodiment, at least one superhard bearing element 524 of the stator 552 may include at least one non-diamond superhard bearing surface, such as only including non-diamond bearing surfaces. Meanwhile the rotor 554 may include a polycrystalline diamond continuous superhard bearing element 502. The superhard bearing elements 524 of the stator 552 often fails before continuous superhard bearing element 502 of the rotor 554. In some instances, this may occur because the superhard bearing surfaces (e.g., superhard bearing surfaces 219 of FIG. 2A) of the stator 552 are often subjected to unequal heating and wear. For example, wear on the superhard bearing surfaces of the stator 552 is often unequal as a result of a small number of superhard bearing elements 524 of the stator 552 being somewhat more "prominent" than the other superhard bearing elements 524 of the stator 552. As a result, contact, heating, and wear during use may be preferentially associated with these more prominent superhard bearing elements 524 of the stator 552. For example, the bulk of the load and resulting wear may be borne by, for example, the one to three most prominent superhard bearing elements 524, while the other superhard bearing elements 524 of the stator 552 may show little wear by comparison. Such wear may result from the difficulty of perfectly aligning the superhard bearing elements 524 of the stator 552.

Because the stator 552 may typically wear faster than the rotor, in an embodiment, the superhard bearing elements 524 of the stator 552 may not include diamond, but include a non-diamond superhard material, as the stator 552 may fail first. In such an embodiment, the stator 552 may be replaced once failure or a given degree of wear occurs. In another embodiment, the stator 552 may include at least one, one or more, or only diamond bearing surfaces, and the rotor 554 may not include a diamond bearing surface. It is currently believed that having at least one diamond surface and at least one non-diamond surface facilitates faster breaking in of the superhard bearing surfaces as the less hard superhard bearing surfaces wear/break in relatively faster. In other embodiments, both the continuous superhard bearing element 502 and at least some of the superhard bearing elements 524 of the tilting pads 516 may be formed from a PDC, diamond or any other type of polycrystalline diamond element disclosed herein. In another embodiment, both the continuous superhard bearing element 502 and at least some of the superhard bearing elements 524 of the tilting pads 516 may be formed from non-polycrystalline diamond materials such as reaction-bonded ceramics or other superhard materials. In yet another embodiment, the continuous superhard bearing element 502 may be formed from non-polycrystalline diamond materials (e.g., reaction-bonded ceramics) or other superhard materials, and at least some of the superhard bearing elements 524 of the tilting pads 516 may be PDCs or other type of polycrystalline diamond elements.

Figure 6A:
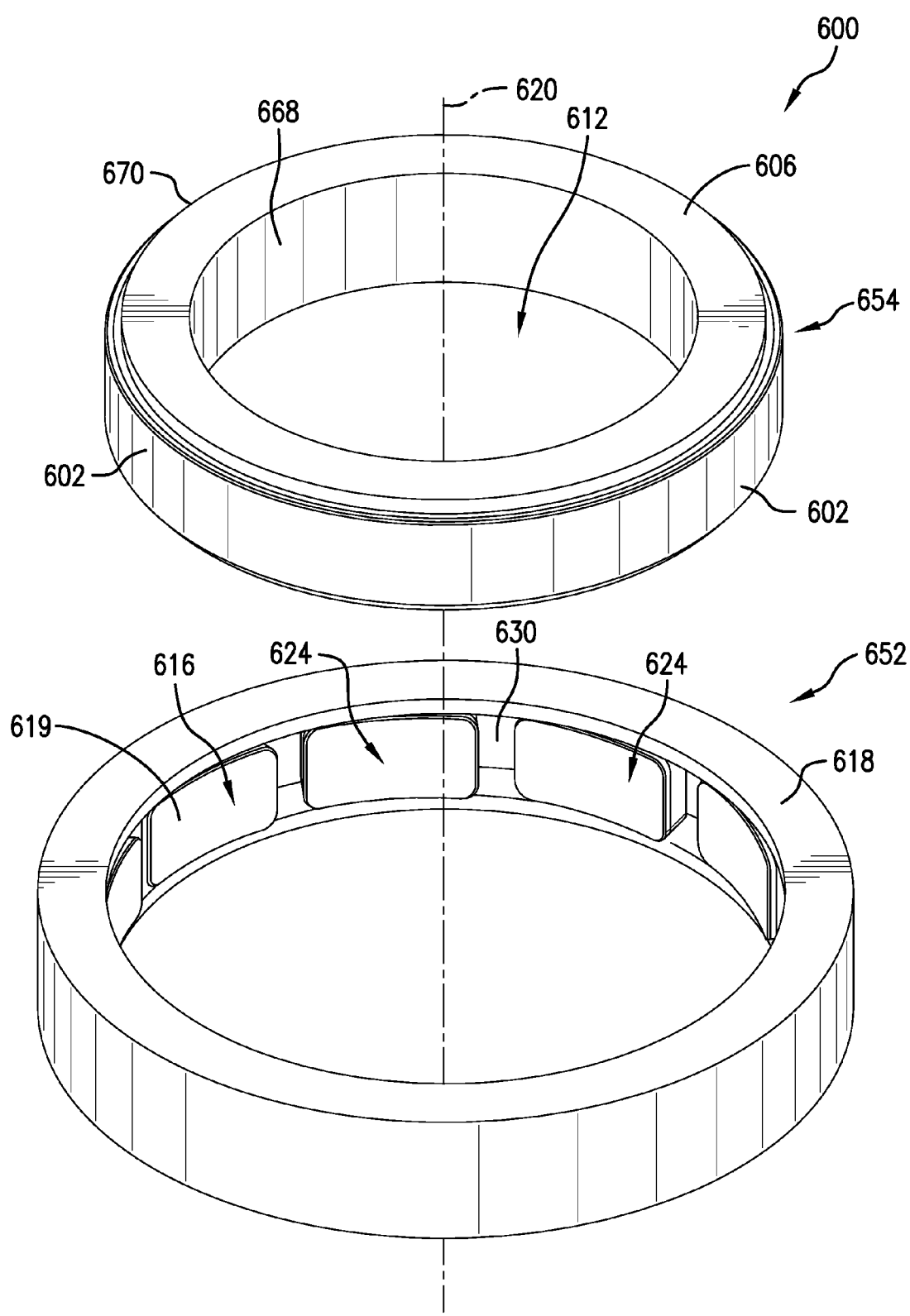
FIG. 6A is an exploded isometric view of a radial bearing apparatus that may include a rotor having a continuous superhard bearing element and a stator including tilting pads according to an embodiment.
Figure 6B:
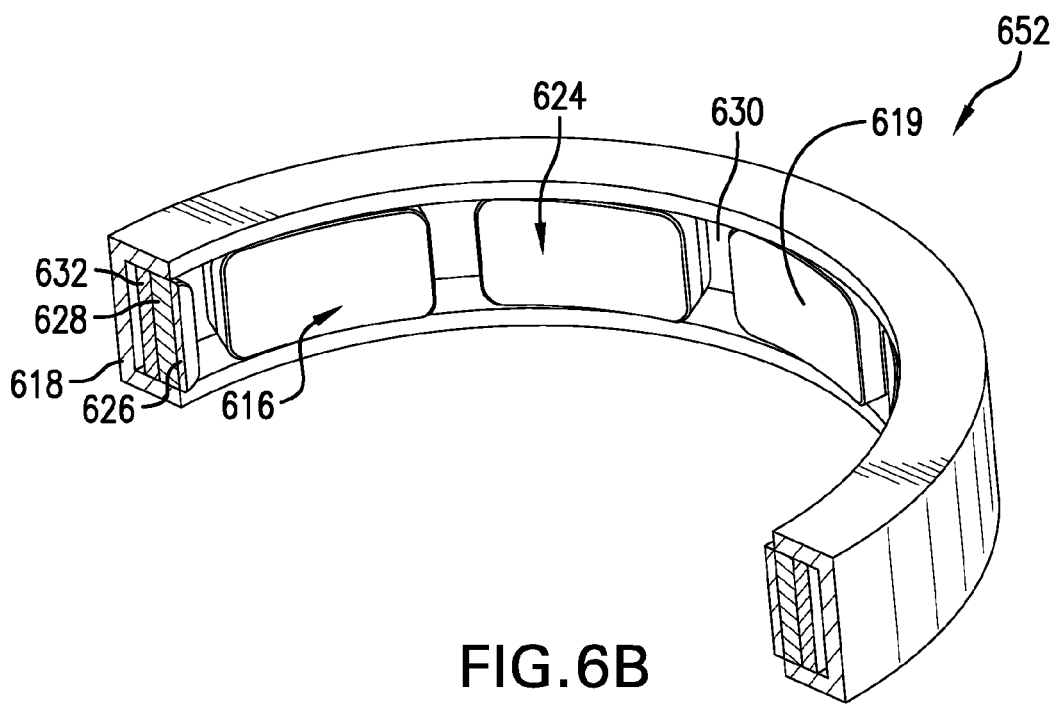
FIG. 6B is an isometric partial cross-sectional view of the stator of the radial bearing apparatus of FIG. 6A according to an embodiment.
Figure 6C:
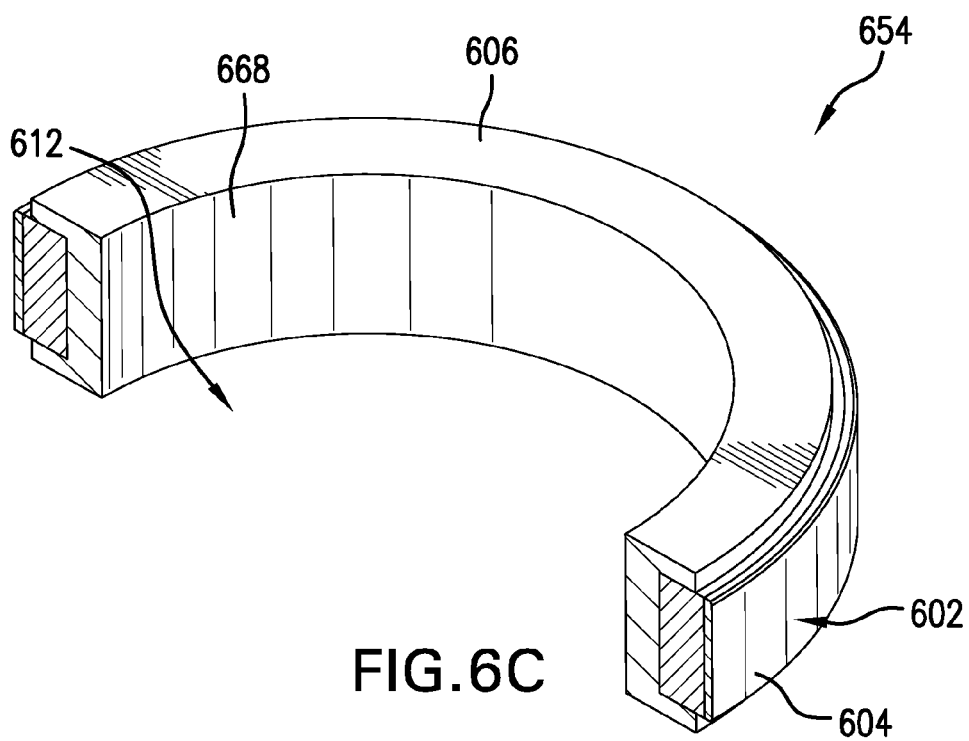
FIG. 6C is an isometric partial cross-sectional view of the rotor of the radial bearing apparatus of FIG. 6A according to an embodiment.

The concepts used in the thrust-bearing assemblies and apparatuses described herein may also be employed in radial bearing assemblies and apparatuses. FIGS. 6A to 6C are isometric, exploded, and isometric partial cross-sectional views, respectively, of a radial bearing apparatus 600 according to yet another embodiment. The radial bearing apparatus 600 may include an inner race 654 (e.g., a runner or rotor) that may have an interior surface 668 defining an hole 612 for receiving a shaft or other component. The inner race 654 may also include a continuous superhard bearing element 602 positioned at or near an exterior surface 670 of the inner race 654. The continuous superhard bearing element 602 may include a convexly-curved continuous superhard bearing surface 604 and may be formed from any of the materials previously discussed for use with the continuous superhard bearing element 102 (FIGS. 1A-1B).

The support ring 606 of the inner race 654 may include a circumferentially-extending recess that receive the continuous superhard bearing element 602. The continuous superhard bearing element 602 may be secured within the recess or otherwise secured to the support ring 606 by brazing, press-fitting, using fasteners, or another suitable technique. The support ring 606 may also define an interior surface 668 defining a hole 612 that is capable of receiving, for example, a shaft (not shown) or other apparatus.

The radial bearing apparatus 600 may further include an outer race 652 (e.g., a stator) configured to extend about and/or receive the inner race 654. The outer race 652 may include a plurality of circumferentially-spaced tilting pads 616, each of which may include a superhard bearing element 624. A superhard bearing surface 619 of the superhard bearing element 624 may be substantially planar, although in other embodiments the superhard bearing surface 619 of the superhard bearing element 624 may be concavely-curved to generally correspond to shapes of convexly-curved continuous superhard bearing surface 604 of the inner race 654. The superhard bearing surfaces 619 of each of the superhard bearing elements 624 generally faces the continuous superhard bearing surface 604. The terms "rotor" and "stator" refer to rotating and stationary components of the radial bearing apparatus 600, respectively. Thus, if the inner race 654 is configured to remain stationary, the inner race 654 may be referred to as the stator and the outer race 652 may be referred to as the rotor.

Rotation of a shaft (not shown) secured to the inner race 654 may effect rotation of the inner race 654 relative to the outer race 652. Drilling fluid or other fluid or lubricant may be pumped between the continuous superhard bearing surface 604 of the continuous superhard bearing element 602 of the inner race 654 and the superhard bearing surfaces 619 of the outer race 652. When the inner race 654 rotates, the leading edge sections of the tilting pads 616 may sweep lubricant (e.g., drilling fluid or other lubricant) onto the superhard bearing surface 619 of the outer race 652. As previously described with respect to the hydrodynamic tilting pad thrust-bearing apparatus 500, at sufficient rotational speeds for the inner race 654, a fluid film may develop between the superhard bearing element 624 of the tilting pads 616 and the continuous superhard bearing element 602, and may develop sufficient pressure to maintain the superhard bearing element 624 and the continuous superhard bearing element 602 apart from each other. Accordingly, wear on the superhard bearing element 624 and continuous superhard bearing element 602 may be reduced compared to when direct contact between superhard bearing element 624 and continuous superhard bearing element 602 occurs.

As further illustrated in FIGS. 6A and 6B, the outer race 652 includes a support ring 618 extending about an axis 620. The support ring 618 may include an interior channel 630 configured to receive a set of tilting pad 616 superhard bearing elements 624 distributed circumferentially about the axis 620. Each tilting pad 616 may include a superhard table 626. The superhard bearing element 624 may be curved (e.g., concavely-curved) or substantially planar and, in some embodiments, may include a peripheral chamfer. The tiling pad 616 may be formed from any of the superhard materials and structures disclosed herein. In other embodiments, the superhard bearing element 624 may be otherwise curved, lack a chamfered edge, may have another contour or configuration, or any combination of the foregoing. Each superhard table 626 may be bonded to a corresponding substrate 628. Further, each superhard bearing element 624 may be tilted circumferentially relative to an imaginary cylindrical surface. The superhard tables 626 and substrates 628 may be fabricated from the same materials described above for the tilting pads 216 shown in FIGS. 2A-2D.

Each superhard bearing element 624 of a corresponding tilting pad 616 may be tilted in a manner that facilities sweeping in of a lubricant or other fluid to form a fluid film between the inner race 654 and the outer race 652. Each tilting pad 616 may be tilted and/or tilt about an axis that is generally parallel to the central axis 620. As a result, each tilting pad 616 may be tilted at an angle relative to the inner and outer surfaces of the support ring 618 and in a circumferential fashion such that the leading edges of the tilting pads 616 are about parallel to the central axis 620. The leading edge may help to sweep lubricant or another fluid onto the superhard bearing surfaces 619 of the stator 652 to form a fluid film in a manner similar to the tilting pads 516 shown in FIGS. 5A and 5B. More particularly, when the inner race 654 is concentrically positioned relative to the outer race 652, the leading edges of the superhard bearing elements 624 may be offset relative to the continuous superhard bearing element 602 by a distance that is larger than a distance between the continuous superhard bearing element 602 and a trailing edge of the superhard bearing elements 624. It should be noted that in other embodiments, the radial bearing apparatus 600 may be configured as a journal bearing. In such an embodiment, the inner race 654 may be positioned eccentrically relative to the outer race 652.

In some embodiments, the tilting pad 616 may be formed from a plurality of superhard bearing segments (not shown) that collectively define a respective tilting pad 616. Each superhard bearing segment may be substantially identical, or the superhard bearing segments may be different relative to other of the superhard bearing segments. In some embodiments, the superhard bearing segments each include a superhard table 626 bonded to a substrate 628 as described herein. Optionally, the substrate 628 may be connected or supported relative to a support plate 632, the support ring 618, or other material or component. Additionally, seams (not shown) may be formed between circumferentially and/or longitudinally adjacent to the superhard bearing elements 602. The edges of the superhard bearing segments may have any number of configurations or shapes, and may correspond to or interlock with adjoining edges in any number of different manners. Further, sealant materials may be disposed within a gap (not shown) that may be formed between adjacent superhard bearing segments to help further prevent fluid leakage through the seams.

Figure 7:
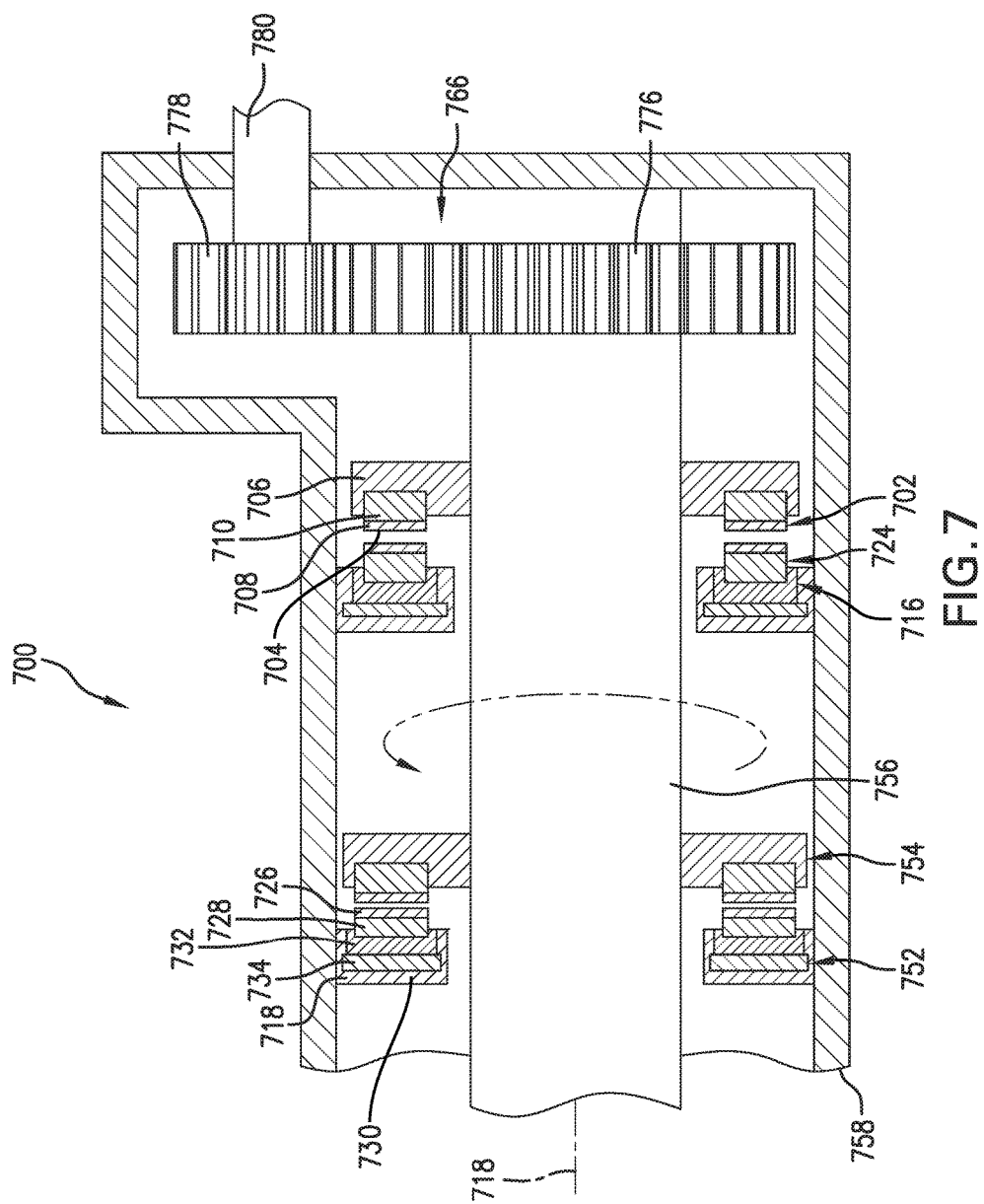
FIG. 7 is a partial isometric cutaway view of a rotary system of a turbine according to an embodiment.

FIG. 7 is a partial isometric cutaway view of an embodiment of a turbine system 700, such as a wind turbine system, which may incorporate any of the bearing apparatus embodiments disclosed herein. The turbine system 700 may include a housing 758 and a main gear shaft 756 operably connected to another device such as a wind turbine, i.e., blades attached to a hub, (not shown). At least one rotor 754 including a continuous superhard bearing element 702 may be operably connected to the main shaft 756. For example, the rotor 754 may be configured as the thrust-bearing assembly 100 shown in FIG. 1A or any other bearing assembly including a continuous superhard bearing element disclosed herein. At least one stator 752 including a plurality of tilting pads 716 may be connected to the housing 758. For example, the stator 752 may be configured as the bearing assembly 200 shown in FIG. 2A or any other tilting pad thrust-bearing assembly disclosed herein. The stator 752 or the rotor 754 may be a split bearing (e.g., manufactured in multiple components) to facilitate assembly. The shaft 756 may extend through a central hole 712 in the rotor 754 and stator 752 and may be secured to each rotor 754 by press fitting or otherwise attaching the gear shaft 756 to each rotor 754 bearing assembly, threadly coupling the shaft 756 to each rotor 754 bearing assembly, or another suitable technique. In the illustrated embodiment, the wind turbine system includes two bearing apparatuses. However, in other embodiments, the wind turbine system may include one or more bearing apparatuses (e.g., one bearing apparatus, or three or more bearing apparatuses).

In an embodiment, the rotor 754 may include a support ring 706 and a continuous superhard bearing element 702 attached or bonded to the support ring 706. The continuous superhard bearing element 702 includes a continuous superhard bearing surface 704. The continuous superhard bearing element 702 may include a superhard table 708 bonded to a substrate 710. Similarly, the stator 752 may include a support ring 718 having a channel 730 therein and a plurality of tilting pads 716 positioned inside the channel 730. The plurality of tilting pads 716 may include a superhard bearing element 724 that may have a superhard bearing table 726 bonded to a substrate 728. The plurality of tilting pads 716 may further include a support plate 732 above a pin 734 wherein the superhard bearing element 724 is bonded or attached to the support place 732. While the stator 752 and the rotor 754 is shown including only one row of the superhard bearing elements 724 and 702, respectively, the stator 752 bearing assembly and the rotor 754 may include two rows, three rows, or any number of suitable rows of the superhard bearing elements.

In an embodiment, wind may turn the blades on the wind turbine (not shown), which in turn may rotate the main shaft 756 about a rotation axis 720. The main shaft 756 may rotate the rotor 754 bearing assembly about the rotation axis 720. As shown, the main shaft 756 may go through a gear transmission box 766. For example, the main shaft 756 may be connected to a first gear 776 that turns a second gear 778 or vice versa. The first gear 776 may be larger than the second gear 778. The second smaller gear 778 may be connected to a shaft 780 that turns a generator (not shown) to produce electricity.

As wind speed increases and energy builds within the system 700, the high thermal conductivity of a diamond or other high thermal conductivity bearing elements may help remove heat from the contact surface between the surfaces of the bearing assemblies. Such a configuration may help reduce the likelihood of temperature induced strength reductions and/or failure in the bearing assemblies. Further, in an embodiment where either the continuous superhard bearing element 702 and at least one of the superhard bearing elements 724 of the tilting pads 716 are formed of more than one material, the modulus contrast between materials may help provide resistance to shock and vibration loading. Such a configuration may help reduce the likelihood of fretting, micro pitting, and/or other types of wear in the rotor 754 and stator 752 bearing assemblies. This may be advantageous given the frequent starts and stops of the system 700. Moreover, in an embodiment, differences between the elasticity of superhard materials may help reduce the likelihood of adhesion.

While the bearing apparatus including the rotor 754 and the stator 752 is shown in a turbine application, the bearing apparatus may be used in other diverse applications. For example, the bearing apparatuses disclosed herein may be used in subterranean drilling and motor assembly, motors, pumps, compressors, generators, gearboxes, and other systems and apparatuses, or in any combination of the foregoing.

While various aspects and embodiments have been disclosed herein, other aspects and embodiments are contemplated. The various aspects and embodiment disclosed herein are for purposes of illustration and are not intended to be limiting. Additionally, the words "including," having," and variants thereof (e.g., "includes" and "has") as used herein, including the claims, shall be open ended and have the same meaning as the word "comprising" and variants thereof (e.g., "comprise" and "comprises").

We claim:

1. A bearing apparatus, comprising
   a first bearing assembly including:
      a first support ring; and
      a plurality of tilting pads each of which includes a superhard bearing element having a superhard bearing surface, each of the plurality of tilting pads tilted and/or tiltably secured relative to the first support ring; and
   a second bearing assembly including:
      a continuous superhard bearing element including a continuous superhard bearing surface that generally faces the superhard bearing element of each of the plurality of tilting pads, the continuous superhard bearing element having a maximum lateral width greater than about 2 inches, the continuous superhard bearing surface including reaction-bonded silicon nitride or reaction-bonded silicon carbide.

2. The bearing apparatus of claim 1 wherein the maximum lateral width is about 2 inches to about 3 inches.

3. The bearing apparatus of claim 1 wherein the maximum lateral width is about 3 inches to about 5 inches.

4. The bearing apparatus of claim 1 wherein the maximum lateral width is about 5 inches to about 12 inches.

5. The bearing apparatus of claim 1 wherein at least one of the continuous superhard bearing element or the superhard bearing element of at least one of the plurality of tilting pads include a superhard table bonded to a substrate.

6. The bearing apparatus of claim 5 wherein the superhard table includes polycrystalline diamond.

7. The bearing apparatus of claim 1 wherein at least one of the continuous superhard bearing surface or the superhard bearing surface of at least one of the plurality of tilting pads includes at least one of silicon carbide, silicon nitride, cubic boron nitride, tantalum carbide, reaction-bonded silicon carbide, reaction-bonded silicon nitride, or binderless tungsten carbide.

8. The bearing apparatus of claim 7 wherein the continuous superhard bearing surface further includes diamond particles.

9. The bearing apparatus of claim 1 wherein the continuous superhard bearing surface of the continuous superhard bearing element and the superhard bearing surface of at least one of the plurality of tilting pads comprise different materials.

10. The bearing apparatus of claim 1 wherein at least one of the superhard bearing surfaces of at least one of the plurality of tilting pads or the continuous superhard bearing element includes a coating.

11. The bearing apparatus of claim 10 wherein the coating includes a chemical vapor deposited coating.

12. The bearing apparatus of claim 11 wherein the chemical vapor deposited coating includes silicon carbide.

13. The bearing apparatus of claim 1 wherein at least one of the continuous superhard bearing surface of the continuous superhard bearing element or the superhard bearing surface of at least one of the plurality of tilting pads has a surface finish of less than about 35 microinches.

14. The bearing apparatus of claim 13 wherein the surface finish is about 5 microinches to about 10 microinches.

15. The bearing apparatus of claim 13 wherein the surface finish is less than about 2.5 microinches.

16. The bearing apparatus of claim 1 wherein the continuous superhard bearing element is brazed to a second support ring.

17. The bearing apparatus of claim 1 wherein each of the plurality of tilting pads includes a plurality of superhard bearing segments assembled to form the superhard bearing surface thereof.

18. The bearing apparatus of claim 1 wherein each of the plurality of tilting pads is tiltable about a respective tilt axis.

19. The bearing apparatus of claim 1 wherein the first bearing assembly is a stator and the second bearing assembly is a rotor.

20. The bearing apparatus of claim 1 wherein the continuous superhard bearing surface includes a single continuous superhard bearing surface.

21. A bearing apparatus, comprising
a first bearing assembly including:
a first support ring; and
a plurality of tilting pads each of which includes a superhard bearing element having a polycrystalline diamond bearing surface, each of the plurality of tilting pads tilted and/or tiltably secured relative to the first support ring; and a second bearing assembly including:
a continuous superhard bearing element including a continuous superhard bearing surface that includes a non-polycrystalline diamond material including reaction-bonded silicon nitride or reaction-bonded silicon carbide, the continuous superhard bearing surface generally faces the superhard bearing element of each of the plurality of tilting pads, the continuous superhard bearing element having a maximum lateral width greater than about 2 inches.

22. The bearing apparatus of claim 21 wherein the continuous superhard bearing surface includes is a single continuous superhard bearing surface.

23. A method of operating a bearing apparatus, the method comprising:
rotating a rotor relative to a stator;
wherein at least one of the stator or the rotor includes:
a first support ring; and
a plurality of tilting pads each of which includes a superhard bearing element having a superhard bearing surface, each of the plurality of tilting pads tilted and/or tiltably secured relative to the first support ring;
wherein the other of the stator or the rotor includes:
a continuous superhard bearing element including a continuous superhard bearing surface that generally faces the superhard bearing element of each of the plurality of tilting pads, the continuous superhard bearing element having a maximum lateral width greater than about 2 inches, the continuous superhard bearing surface including reaction-bonded silicon nitride or reaction-bonded silicon carbide.

24. The method of claim 23 wherein the continuous superhard bearing surface includes is a single continuous superhard bearing surface.

25. A method for manufacturing a bearing assembly, the method comprising:
providing a continuous superhard bearing element that includes a continuous superhard bearing surface including reaction-bonded silicon nitride or reaction-bonded silicon carbide;
forming a hole generally in a center of the continuous superhard bearing element;
providing a support ring including a recess configured to receive the continuous superhard bearing element;
attaching the continuous superhard bearing element to the support ring such that the continuous superhard bearing element is secured in the recess of the support ring; and
smoothing the continuous superhard bearing surface of the continuous superhard bearing element to exhibit a surface finish of less than 20 microinches.

26. The method of claim 25 wherein providing a continuous superhard bearing element that includes a continuous superhard bearing surface includes providing a polycrystalline diamond table that at least partially defines the continuous superhard bearing surface, wherein the polycrystalline diamond table is bonded to a substrate.

* * * * *